United States Patent
Hofmeister et al.

[11] Patent Number: 5,785,898
[45] Date of Patent: *Jul. 28, 1998

[54] POTASSIUM LITHIUM TANTALATE NIOBATE PHOTOREFRACTIVE CRYSTALS

[75] Inventors: Rudolf Hofmeister, Pasadena; Amnon Yariv, San Marino, both of Calif.; Aharon Agranat, Mevaseret Zion, Israel

[73] Assignee: California Institute of Technology, Pasadena, Calif.

[*] Notice: The portion of the term of this patent subsequent to Mar. 25, 2014, has been disclaimed.

[21] Appl. No.: 713,279

[22] Filed: Sep. 12, 1996

Related U.S. Application Data

[63] Continuation of Ser. No. 50,898, Apr. 21, 1993, Pat. No. 5,614,129.

[51] Int. Cl.$^6$ .............................. G02B 5/20; G02B 26/08
[52] U.S. Cl. ............................................ 252/584; 359/301
[58] Field of Search .................................. 252/582, 584; 359/301

[56] References Cited

U.S. PATENT DOCUMENTS

| | | | |
|---|---|---|---|
| 4,001,076 | 1/1977 | Robinson et al. | 156/624 |
| 5,145,713 | 9/1992 | Ventatesak et al. | 427/53.1 |
| 5,335,062 | 8/1994 | Hofmeister et al. | 356/347 |
| 5,422,873 | 6/1995 | Kewitsch et al. | 252/582 |
| 5,581,396 | 12/1996 | Kubota et al. | 252/582 |

OTHER PUBLICATIONS

Fukuda, Japanese Journal of Applied Physics, vol. 9, No. 6, Jun. (1970).

Agranat, A.; Hofmeister, R. and Yariv, A.: "Characterization of a new photorefractive material: $K_{1-y}L_yT_{1-x}N_x$," Optical Soc. of Amer. vol. 17, No. 10, May 15, 1992, pp. 713–715.

Fukuda, T.: "Structural and Dielectric Studies of Ferroelectric $K_3Li_2(Ta_xNb_{1-x})_5O_{15}$," Japanese Journal of Applied Physics, vol. 9, No. 6; Jun. 1970, pp. 599–606.

Bonner, W.A.; Grodkiewicz, W.H. and Van Uitert, L.G.: "The Growth of $K_{0.6}Li_{0.4}NbO_3$ Crystals for Electro–Optic and Non–Linear Applications," Journal of Crystal Growth 1 (1967), pp. 318–319.

Agranat, A.; Leyva, V.; Sayano, K.; Yariv, A.: "Photorefractive properties of $KTa_{1-x}Nb_xO_3$ in the paraelectric phase," Proc. of SPIE, vol. 1148 (1989), pp. 1–15.

Van Uitert, L.G.; Singh, S.; Levinstein, H.L.; Geusic, J.E.; Bonner, W.A.: "A New and Stable Nonlinear Optical Material," Applied Physics Letters, vol. 11, No. 5, Sep. 1, 1967, pp. 161–163.

*Primary Examiner*—Philip Tucker
*Attorney, Agent, or Firm*—Oppenheimer Poms Smith

[57] ABSTRACT

Photorefractive crystals having the formula $K_{1-y}Li_yTa_{1-x}Nb_xO_3$ wherein x is between 0 and 1 and y is between 0.0001 and 0.15. The crystals are useful as a photorefractive material for use in optical systems. The crystals may be doped with various first transition elements and lanthanides including copper, vanadium, chromium, iron, and manganese, nickel, europium and cerium.

10 Claims, 3 Drawing Sheets

POTASSIUM LITHIUM TANTALATE NIOBATE PHOTOREFRACTIVE CRYSTALS

This is a continuation of application Ser. No. 08/050,898 filed on Apr. 21, 1993 now U.S. Pat. No. 5,614,129.

BACKGROUND OF THE INVENTION

1. Field of the Invention

The present invention relates generally to photorefractive crystals which are used in optical computing and optical memory systems. More particularly, the present invention relates to the growth of potassium lithium tantalate niobate crystals which are suitable for use in optical computing and optical memory systems.

2. Description of Related Art

Photorefractive materials and their use in memory systems and computer networks is an area of technology which is undergoing continuing research and development. The special nature of holographic memories makes them especially well-suited for implementing unconventional computing algorithms, such as associative memories and neural networks. The value of photorefractive materials in volume holography is appreciated when it is considered that the data storage density of such holographic media is expected to be on the order of $10^{12}$ bit cm$^{-3}$. In addition, the data retrieval rate from such photoreactive materials is expected to be on the order of up to 10 Gbit/sec.

It has long been recognized that potassium tantalate niobate (KTN) is a promising photorefractive material. However, the phase transition of KTN becomes first order at 220° K. The first order nature of the phase transition causes substantial deterioration of the optical quality of KTN.

Potassium lithium tantalate (KLT) is a crystal which has been suggested for use in studies of solid state physics. However, the use of KLT has not been extended to optical systems.

In view of the above problems, there is a continuing need to provide new photorefractive materials which are suitable for use in a wide variety of optical systems including optical computing, optical memories, optical sensing devices and optical neural networks. Preferably, photorefractive materials should be amenable to use in such systems at room temperature in order to make them useful as a practical matter.

SUMMARY OF THE INVENTION

In accordance with the present invention, a new photorefractive material has been discovered. The new material is a crystal having the formula $K_{1-y}Li_yTa_{1-x}Nb_xO_3$ wherein x is between 0 and 1 and y is between 0.0001 and 0.15. The new photorefractive material in accordance with the present invention is a transparent material which shows a very large electrooptic effect just above its Curie temperature. The Curie temperature increases with both increasing niobium and lithium concentration. It is given roughly by $T_c=\{850[x]+30 \tanh[y]/0.002]\}$°K., where [x]=molar niobium concentration and [y]=molar lithium concentration. This equation is valid for crystals having $[x] \approx 0.30$. When [x] is smaller, the lithium has a stronger effect and $T_c \approx \{850[x]+1000[y]\}$°K. The crystals have the cubic perovskite structure and are readily doped with transition metals.

The photorefractive materials in accordance with the present invention are grown in a non-stoichiometric flux which contains an excess of potassium, since both potassium tantalate and potassium niobate melt incongruently. The crystal is grown in accordance with the present invention using a top-seeded solution growth procedure. When copper and vanadium are utilized together as dopants, the resulting crystal is pale olive green and has only weak striations. Photorefractive crystals grown in accordance with the present invention are especially well-suited for use in a wide variety of optical systems since the crystals undergo a weak first order or a second order phase transition at room temperature. The photorefractive material is suitable for use in optical computing and optical memory systems as well as optical sensors and optical neural networks.

The above-described and many other features of the present invention will become better understood by reference to the following detailed description when taken in conjunction with the accompanying drawings.

DETAILED DESCRIPTION OF THE INVENTION

Photoreactive materials in accordance with the present invention are crystals which are formed by a solid solution having the formula $K_{1-y}Li_yTa_{1-x}Nb_xO_3$ wherein x is between 0 and 1 and y is between 0.0001 and 0.15. These KLTN crystals have the perovskite structure and, depending upon temperature, display conventional photorefractive effect, the zero electric field photorefractive effect (ZEFPR effect), voltage controlled effect and may display the dielectric photorefractive effect. Various dopants are preferably incorporated into the crystals. These dopants include the first transition elements and lanthanides. Exemplary dopants include copper, chromium, vanadium, iron, manganese, and nickel. Europium and cerium are also expected to yield photorefractive response. Copper and vanadium are preferred dopants which may be used individually or in combination.

Although any of the photorefractive crystals having the above formulation are suitable for use in a wide variety of systems, it is preferred that y be between about 0.005 and 0.09. The photorefractive crystals in accordance with the present invention may be made by any number of conventional crystal growth procedures. Preferably, the crystals are grown from a flux using the top-seeded solution growth method. In order to grow crystals having the appropriate composition, the flux should include: 45 to 65 mole percent potassium; 0.5 to 33 mole percent lithium; 12 to 34 mole percent tantalum; 6 to 28 mole percent niobium; and 0 to 10 mole percent of one or more of the above listed dopants.

The flux is preferably prepared by mixing appropriate amounts of potassium carbonate, lithium carbonate, tantalum oxide, niobium oxide and appropriate dopant oxides. The various ingredients are mixed to form a solids mixture which is then heated to an appropriate temperature to form a flux. Exemplary solids mixtures which can be heated to form fluxes in accordance with the present invention will include 45 to 57 mole % potassium carbonate which is combined with 0.5 to 15 mole % lithium carbonate, 10 to 28 mole % tantalum oxide, 10 to 28 mole % niobium oxide and 0 to 7 mole % of the desired dopant oxide.

Figure 1:
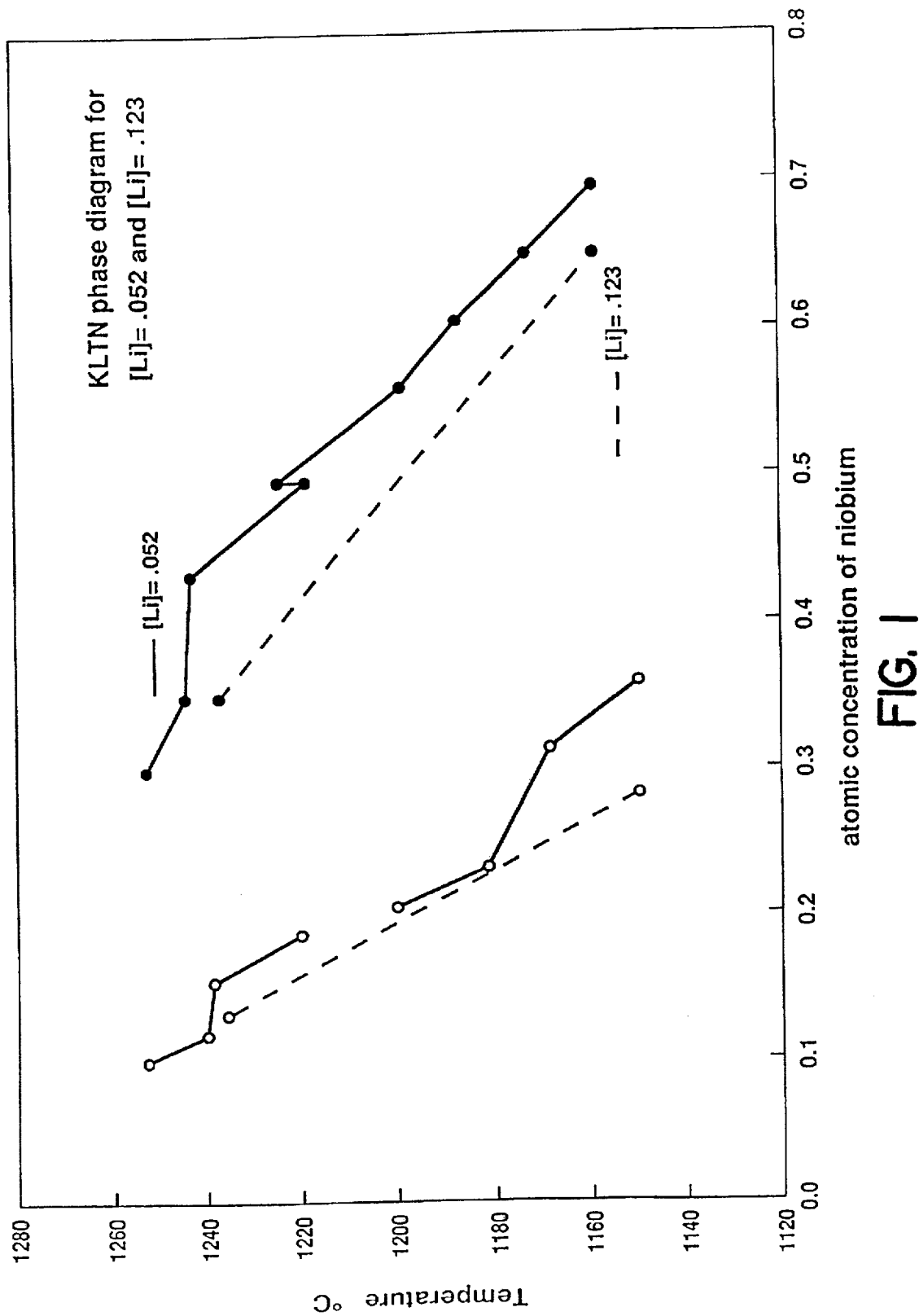
FIG. 1 is a phase diagram of KLTN for two different lithium concentrations as a function of niobium concentration.

The solids mixture is heated to a temperature on the order of 1250° to 1350° C. in order to form the flux. The color, structure and composition of crystals in accordance with the present invention depend principally on the flux composition. In contrast, the shape, size and quality of the resulting crystal are functions of both flux composition and the crystal growth parameters. The phase diagram for KLTN for flux lithium concentrations of [Li]=0.05 and [Li]=0.123 is shown in FIG. 1 as a function of niobium concentration. The phase diagram shows liquidus and solidus curves of temperature versus niobium concentration. The change in these curves with increasing lithium concentration is illustrated by the difference in the curves for two lithium flux concentrations, i.e. Li=0.052 and Li=0.12.

The KLTN crystals in accordance with the present invention are preferably grown from a non-stoichiometric flux which contains an excess of potassium carbonate since both potassium tantalate and potassium niobate melt incongruently. The top-seeded solution growth method (TSSG) is preferably used wherein the growing crystal nucleates on a cooled seed which touches the flux. The TSSG method is described in detail in A. Agranat, V. Leyva, K. Sayano, and A. Yariv, "Photorefractive properties of $KTa_{1-x}Nb_xO_3$ in the parelectric phase," Proc. of SPIE, Vol. 1148, Conference on Non-Linear Materials, (1989).

In general, the ingredients for the melt or flux are mixed together in an excess of an appropriate solvent such as potassium carbonate. The mixture is then heated to form a molten flux which is soaked at high temperature for a sufficient amount of time to ensure thorough mixing. The molten flux is then cooled to approximately 30° C. above the anticipated growth temperature. The seed KLTN crystal is then touched to the surface of the flux for about one minute. The seed crystal is then raised to see if melting has occurred. If the seed crystal has partially melted, the temperature of the flux is dropped 10° C. If the seed crystal has not begun to melt, the temperature is dropped 2° C. This procedure of dropping the melt temperature based upon partial melting of the seed crystal is repeated until the rounded edges of the seed begin to sharpen into a square. This sharpening of the rounded edges of the seed crystal into a square is the preferred method of determining when growth of the crystal is starting.

Once crystal growth has started, the seed crystal is then re-dipped and is left undisturbed for at least 20 hours while the temperature of the molten flux is reduced at a rate of 0.5°–1.0° C. per hour. Then, if the crystal appears to be growing properly, the pulling of the crystal from the melt is begun. Pulling is preferably done at a rate of 0.5 mm per hour until the crystal is free of the flux. Pulling of the crystal takes between 25 to 36 hours. If desired, the cooling rate may be increased during the pulling stage to a rate of 1°–1.5° C. per hour. After the crystal has been pulled from the melt, it is preferably slowly annealed to room temperature. The final temperature of the melt towards the end of the pulling stage will be on the order of 1050°–1180° C. During annealing to room temperature, the temperature of the crystal is lowered at a rate of between about 10° C. to about 30° C. per hour. Examples of practice are as follows:

EXAMPLE 1

A flux was prepared by mixing the amounts of various powdered ingredients as set forth in Table 1. The powdered ingredients were packed into a 100 ml platinum crucible and heated to 1300° C. at a rate of 45° C. per hour.

TABLE 1

| Material | Formula Weight | Mole % | Final Weight (gm) |
| --- | --- | --- | --- |
| $K_2CO_3$ | 138.21 | 50.0 | 44.0000 |
| $Li_2CO_3$ | 73.82 | 7.0 | 3.2900 |
| $Ta_2O_5$ | 441.90 | 24.7 | 69.5000 |
| $Nb_2O_5$ | 265.82 | 13.3 | 22.5100 |
| 2CuO | 159.09 | 2.5 | 2.5300 |
| $V_2O_5$ | 181.88 | 2.5 | 2.9000 |

After 15 hours of soaking at 1300° C., the flux was cooled to 1260° C. at a rate of 45° C. per hour. During the cooling, a conventional pulling tube with an attached seed crystal was slowly lowered into the furnace and allowed to come to thermal equilibrium. The seed crystal was rotated at 25 rpm with the rotation direction reversed every 195 seconds. Approximately 5 liters per minute of air was passed through the tube for cooling. The seed crystal was a 3×3×9 $mm^3$ crystal which had been cut from previously grown crystals with a similar composition.

When the flux/seed crystal system came to thermal equilibrium, the seed was dipped into the flux. The seed crystal melted slightly after two minutes of dipping. Then, the temperature was lowered and the process repeated. Finally, crystal growth began at 1250° C. After 5 minutes of growth, the seed crystal was again raised out of the flux to verify that the crystal was developing a sharp square profile as mentioned previously. Then, the crystal was left in the flux to grow while the flux was cooled at a rate of 0.5° C. per hour. After 24 hours of growth, a rectangular outline of the submerged crystal was visible in the flux. At this point, pulling of the crystal from the flux began. The pulling was done at a rate of 0.5 mm per hour and lasted for 36 hours. Once the crystal had been pulled from the flux, it was annealed at a rate of 150° per hour down to room temperature. The entire crystal growing and annealing process took nine days.

The resultant crystal was an oblong rectangle (7.60× 15.60×20.75 $mm^3$ with subadamantine polish on all facets. Small facets of [110] growth surrounded the seed; otherwise, all of the facets were [100]. The crystal was of high optical quality under magnification. Slight striations were visible with crossed polarizers. The crystal weighed 16.33 grams including the seed. Electron microprobe and atomic absorption analysis were performed on an identically manufactured crystal. The composition was determined to be $K_{0.95}Li_{0.0511}Ta_{0.867}Nb_{0.129}O_3:Cu_{0.004}$. Powder X-ray diffraction indicated a perovskite structure with lattice spacing of A=3.99 angstroms. The phase transition temperature for the crystal was 180° K.

EXAMPLE 2

The same crystal growth procedure as set forth in the preceding example was followed except that the powdered ingredients for the flux were combined in the amounts listed in Table 2.

TABLE 2

| Material | Formula Weight | Mole % | Final Weight (gm) |
| --- | --- | --- | --- |
| $K_2CO_3$ | 138.21 | 53.0 | 38.00 |
| $Li_2CO_3$ | 73.82 | 5.0 | 1.9148 |

TABLE 2-continued

| Material | Formula Weight | Mole % | Final Weight (gm) |
| --- | --- | --- | --- |
| $Ta_2O_5$ | 441.90 | 11.10 | 25.4457 |
| $Nb_2O_5$ | 265.82 | 25.90 | 35.7141 |
| 2CuO | 159.09 | 2.5 | 2.0633 |
| $V_2O_5$ | 181.88 | 2.5 | 2.3588 |

For the flux composition of Table 2, crystal growth on the seed began at 1142° C. The crystal pulling and annealing was carried out under the same conditions as set forth in Example 1. The resulting crystal also exhibited high optical quality and had the perovskite structure. The phase transition temperature for this crystal was 310° K.

EXAMPLE 3

The same procedure as utilized in the preceding two examples was used to grow a crystal from a flux having the initial powder composition set forth in Table 3.

TABLE 3

| Material | Formula Weight | Mole % | Final Weight (gm) |
| --- | --- | --- | --- |
| $K_2CO_3$ | 138.21 | 57.0 | 45.00 |
| $Li_2CO_3$ | 73.82 | 1.0 | 0.4217 |
| $Ta_2O_5$ | 441.90 | 14.0 | 35.3385 |
| $Nb_2O_5$ | 265.82 | 26.0 | 39.4767 |
| $Fe_2O_3$ | 159.69 | 1.0 | 0.9122 |
| $2TiO_2$ | 159.76 | 1.0 | 0.9126 |

Crystal growth on the seed began at 1178° C. and the final weight of crystal was 7.3 gm.

EXAMPLE 4.

The same crystal growth procedure as in the preceding examples was followed for growing a crystal from a flux having the initial powder composition as set forth in Table 4.

TABLE 4

| Material | Formula Weight | Mole % | Final Weight (gm) |
| --- | --- | --- | --- |
| $K_2CO_3$ | 138.21 | 57.9 | 48.00 |
| $Li_2CO_3$ | 73.82 | 1.02 | 0.4498 |
| $Ta_2O_5$ | 441.90 | 12.21 | 32.3770 |
| $Nb_2O_5$ | 265.82 | 25.37 | 40.4485 |
| $2MnO_2$ | 159.09 | 1.0 | 1.0430 |
| $V_2O_5$ | 181.88 | 2.5 | 2.7274 |

The crystal growth temperature for this flux began at 1157° C. and the final weight of the crystal composition was 1.47 gm.

EXAMPLE 5

A crystal was grown using the same procedure as utilized in the prior examples except that the initial powdered flux at the composition as forth in Table 5.

TABLE 5

| Material | Formula Weight | Mole % | Final Weight (gm) |
| --- | --- | --- | --- |
| $K_2CO_3$ | 138.21 | 57.0 | 46.00 |
| $Li_2CO_3$ | 73.82 | 1.0 | 0.4310 |
| $Ta_2O_5$ | 441.90 | 12.95 | 33.4147 |
| $Nb_2O_5$ | 265.82 | 24.05 | 37.3276 |
| $2Cr_2O_3$ | 159.99 | 3.0 | 2.6624 |
| $V_2O_5$ | 181.88 | 2.0 | 2.1240 |

Crystal growth began at 1201° C. with the final weight of the crystal being 5.62 gm. It should be noted that although the flux contained chromium and vanadium dopants, the crystal which grew was undoped. The vanadium completely inhibited the introduction of chromium into the crystal.

EXAMPLE 6

A series of crystals were grown from flux compositions which were similar to the fluxes set forth in Tables 1 and 2. The crystals were grown using the same crystal growth procedure and the same amount of copper and vanadium dopants. The various flux compositions and resulting crystal composition, along with the temperature at which crystal growth began are set forth in Table 6. In Table 6, the first two columns show the combined potassium plus lithium and tantalum plus niobium concentrations in the flux. In all but one flux (crystal number 95) the sum of the potassium plus lithium and tantalum plus niobium concentrations was 0.95. The fraction remaining from 1.0 (i.e., 0.05) was split equally between the copper and vanadium dopants in the same manner as the compositions as set forth in Tables 1 and 2. The next two columns in Table 6 under Flux Compositions show the relative concentrations of niobium and lithium where X=[Nb]/([Nb]+[Ta]) and Y=[Li]/([Li]+[K]). The columns listed under Crystal Composition set forth the mole concentrations of the four constituents in the grown crystal. As previously mentioned, the composition of the flux does not necessarily correlate directly with crystal compositions.

TABLE 6

| Crystal No. | Flux Composition | | | | Crystal Composition | | | | Init. Cry. Growth Temp.(°C.) |
| --- | --- | --- | --- | --- | --- | --- | --- | --- | --- |
| | % K + Li | % Ta + Nb | X | Y | [K] | [Li] | [Ta] | [Nb] | |
| 91 | 58 | 37 | 0.5 | 0.01724 | 0.992 | .0025 | 0.830 | 0.17 | 1216 |
| 85 | 58 | 37 | 0.65 | 0 | 0.992 | 0 | 0.768 | 0.29 | 1177 |
| 86 | 58 | 37 | 0.65 | 0.0086 | 0.994 | .0006 | 0.700 | 0.299 | 1179 |

TABLE 6-continued

| Crystal No. | Flux Composition % K + Li | Flux Composition % Ta + Nb | X | Y | Crystal Composition [K] | Crystal Composition [Li] | Crystal Composition [Ta] | Crystal Composition [Nb] | Init. Cry. Growth Temp.(°C.) |
|---|---|---|---|---|---|---|---|---|---|
| 84 | 58 | 37 | 0.65 | 0.0172 | 0.990 | .0019 | 0.730 | 0.27 | 1188 |
| 98 | 58 | 37 | 0.65 | 0.03 | 1.016 | .0023 | 0.721 | 0.273 | 1175 |
| 88 | 58 | 37 | 0.7 | 0 | 1.00 | 0 | 0.667 | 0.333 | 1160 |
| 97 | 58 | 37 | 0.3 | 0.0517 | 1.004 | .0091 | 0.908 | 0.089 | 1250 |
| 96 | 58 | 37 | 0.35 | 0.0517 | 0.998 | .0092 | 0.893 | 0.105 | 1241 |
| 74 | 58 | 37 | 0.45 | 0.0517 | 0.990 | .005 | 0.857 | 0.144 | 1240 |
| 75 | 58 | 37 | 0.5 | 0.0517 | 0.980 | .006 | 0.827 | 0.176 | 1219 |
| 76 | 58 | 37 | 0.5 | 0.05417 | | | | | 1225 |
| 81 | 58 | 37 | 0.55 | 0.0517 | 0.990 | .007 | 0.794 | 0.206 | 1197 |
| 82 | 58 | 37 | 0.6 | 0.0517 | 0.989 | .007 | 0.777 | 0.223 | 1185 |
| 83 | 58 | 37 | 0.65 | 0.0517 | 0.993 | .006 | 0.687 | 0.314 | 1171 |
| 95 | 61.05 | 38.95 | 0.65 | 0.0517 | 1.020 | .0044 | 0.072 | 0.275 | 1161 |
| 93 | 58 | 37 | 0.7 | 0.0517 | 1.031 | .0052 | 0.644 | 0.347 | 1153 |
| 33 | 61 | 34 | 0.4 | 0.082 | 0.999 | | 0.896 | 0.102 | 1193 |
| 87 | 57.6 | 37.4 | 0.65 | 0.0877 | 1.006 | .012 | 0.677 | 0.32 | 1169 |
| 73 | 57 | 38 | 0.35 | 0.1228 | 0.991 | .0212 | 0.888 | 0.112 | 1243 |
| 90 | 58.5 | 36.5 | 0.65 | 0.1227 | 0.985 | .015 | 0.708 | 0.293 | 1153 |
| 58 | 60 | 35.5 | 0.2986 | 0.2633 | 0.933 | .035 | 0.894 | 0.095 | 1196 |
| 60 | 60 | 35 | 0.3 | 0.3 | 0.931 | .032 | 0.881 | 0.108 | 1123 |
| 61 | 60 | 35 | 0.3 | 0.333 | 0.604 | .320 | 0.969 | 0.082 | 1188 |
| 69 | 63 | 32.4 | 0.3 | 0.333 | 0.951 | .0645 | 0.975 | 0.032 | 1185 |
| 64 | 63 | 32.4 | 0.1429 | 0.333 | 0.950 | .0601 | 0.979 | 0.029 | 1157 |
| 67 | 64.5 | 34.6 | 0.1428 | 0.36511 | 0.941 | .0757 | 0.979 | 0.031 | 1217 |

Figure 2:
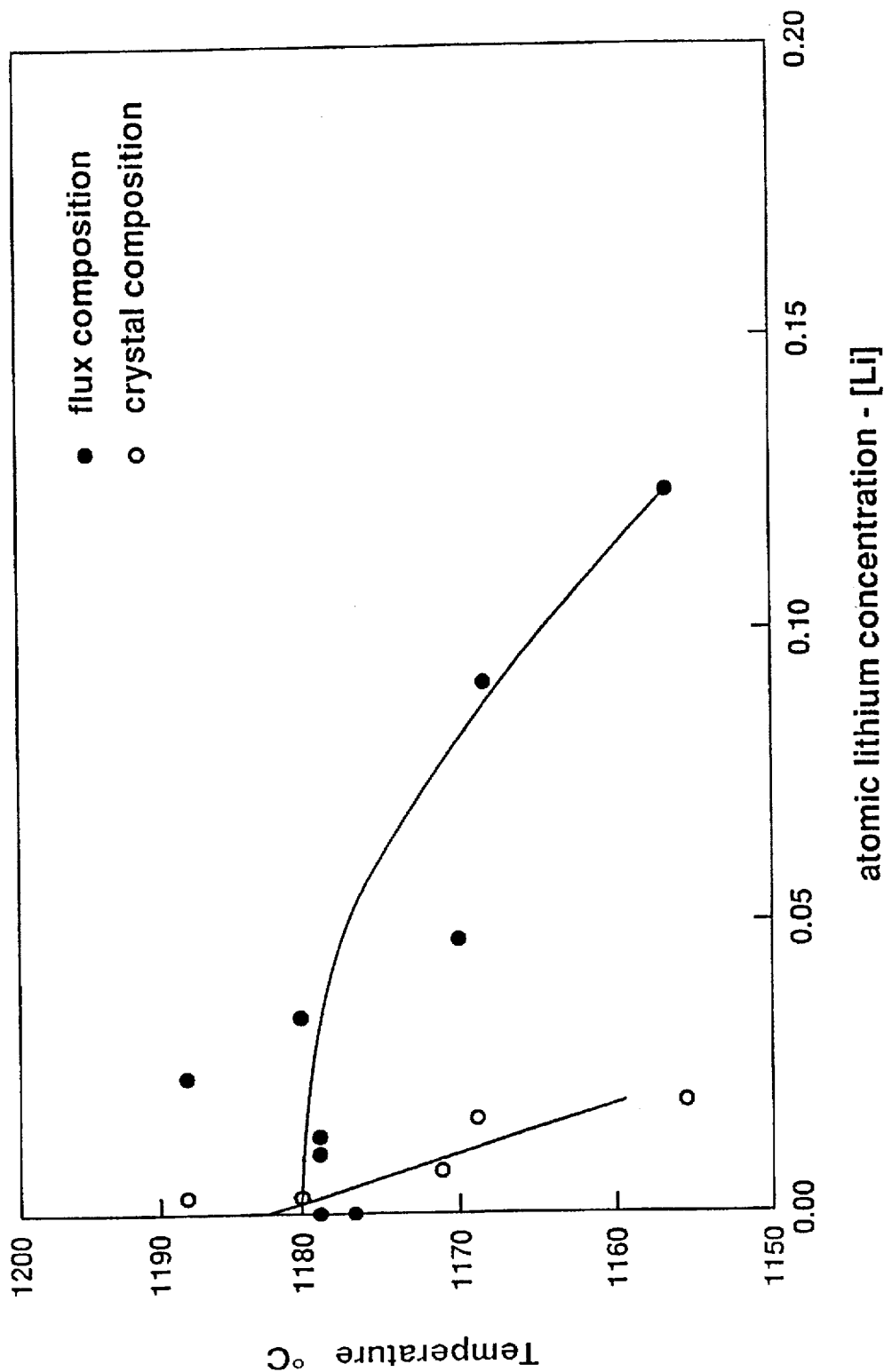
FIG. 2 is a phase diagram of KLTN for [Nb]=0.65 in the flux as a function of lithium concentration.

The phase diagram of KLTN for [Nb]=0.65 in the flux, as a function of lithium concentration is shown in FIG. 2. The deviations from a smooth curve are caused by variations in the resultant crystal's niobium content. There is, in other words, a coupling between the lithium and niobium flux/crystal concentrations so that a constant niobium flux concentration does not yield a perfectly constant crystal niobium content if the lithium concentration is varied.

It is seen from FIG. 2 that the lithium/potassium ratios exhibit a solid solution behavior for Y<0.33, with y<Y (See Table 6). These crystals are all cubic perovskites at room temperature. For Y greater than or equal to 0.33, however, the composition and structure abruptly changes. These crystal growths, crystal No. 61 (see Table 6), are dense and brittle materials, with the characteristic midnight blue color of oxygen vacancies. The growth habit displayed [100] as well as [110] and [210] faces. These materials were strongly pleochroic, and X-ray diffraction confirmed they were not cubic. The X-ray peaks are very similar to those of $K_3Li_2$ $(Ta_{1-x}Nb_x)O_3$ compounds which have the ilmenite tungsten bronze structure. The measured composition, $K_{0.6}Li_{0.32}$ $(TaNb)O_3$, is consistent with this statement. This abrupt compositional and structural change is believed to be attributed to an instability due to the size differential between the lithium and potassium ions. It should be noted that the transition from cubic to tungsten bronze growth can be forestalled somewhat by boosting the (potassium+lithium)/(tantalum+niobium) ratios, as in crystal 67 (Table 6), though these materials invariably grew with flux inclusions and were pyramid rather than cube shaped.

The color of the KLTN crystals grown in accordance with the present invention is due to copper doping, lithium concentration, and niobium/tantalum ratio. Crystals grown without dopants were colorless. The copper ion is present in KLTN as either $Cu^{1+}$ or $Cu^{2+}$, with absorption peaks at approximately 410 and 580 nm respectively, the exact position of the peak depends somewhat on the lattice composition. The relative strengths of these peaks is a direct indicator of the relative concentrations of these oxidation states where $[Cu]=[Cu^{1+}]+[Cu^{2+}]$.

In crystals with small niobium concentration, when X≦0.4 (x is defined in Table 6), the color is olive green. As X is increased, however, color banding is observed, from yellow near the seed to bright green at the later growing parts of the crystal. These colors were confirmed to be the result of a progressively increasing $[Cu^{2+}]/[Cu]$ ratio, from 0 at the outset of growth to approximately $[Cu^{2+}]/[Cu]=0.15$ near the end. Additionally, when lithium is omitted from the flux composition, the crystals grow a blue core surrounded by the yellow and green bands. The blue indicates oxygen vacancies, as evidenced by absorption data. As little as 0.5 mole % of lithium in the flux prevents the blue color, and as such markedly improves the growth quality of KLTN over that of KTN.

The vanadium present in the flux as a dopant is believed to play no role in the coloring of the crystal. The vanadium is only present in minute quantities in the growth crystal. Multiple attempts were made to grow KTN:Cu without the presence of vanadium in the flux. These attempts failed to produce high quality doped samples. It is believed that the vanadium assists in the introduction of copper into the perovskite lattice.

Several growth parameters have considerable influence on the quality of the growth crystals in accordance with the present invention. An important parameter for good growth is the temperature. If seeding takes place more than a few degrees below the proper growth temperature, rapid growth with associated flux inclusions results until the system reaches equilibrium. The maintenance of a temperature gradient between the seed and the rest of the furnace is also required. If the air flow is inadequate or the seed becomes loose during the growth, the growth will be polycrystalline. Proper cooling in accordance with the procedures previously described leads to a single nucleation site and single crystal growth.

It is preferred that the flux ingredients remain as uniform as possible because the proper growth temperature is a function of the flux composition. The flux is preferably stirred by rotating the seed. In order to maintain a homogeneous flux composition and temperature profile, the seed rotation direction is periodically reversed. However, every time the rotation direction is reversed, growth accelerates briefly, causing striations. A possible explanation for this phenomenon is that the tantalum tends to settle out, and that the rotation reversal generates turbulence bringing the tantalum-rich mixture to the surface. The increase in tantalum concentration (decrease in X) leads to an increased growth temperature, which causes the growth rate acceleration. The longer the period of time between rotation reversals, the more tantalum has settled out, and the more violent the growth acceleration on rotation reversal. Accordingly, it is preferred that more frequent rotation reversals be used to reduce possible growth rate acceleration.

As an example, when the rotation direction was switched every 13 minutes during the growth of crystal No. 87, flux inclusions resulted along the growth line boundaries. However, when the rotation was reversed every 6 minutes, no inclusions were formed. For the same reason, the rotation rate should be kept constant. In one instance, the rotation rate was increased from 25 to 30 rpm causing flux inclusions to be deposited on the face of the developing crystal for approximately one hour.

The KLTN crystals in accordance with the present invention are particularly well-suited for use in phase modulation and motion sensing devices. For example, the KLTN crystals are especially well-suited for use in systems of the type described in U.S. Pat. No. 5,335,062. The contents of this patent, as well as any of the other references referred to herein are incorporated by reference.

Diffraction experiments were performed with the crystal prepared in Example 1. The crystal was maintained at a temperature of 15° C. above the transition temperature. Writing argon laser beams were at either 488 nm or 514 nm. They were ordinary-polarized to minimize beam interaction. The diffraction efficiency of the grating thus written was monitored with a weak extraordinary-polarized HeNe beam at 633 nm. The 633 nm beam was verified not to erase the grating. The writing continued until the maximum diffraction was achieved.

Figure 3:
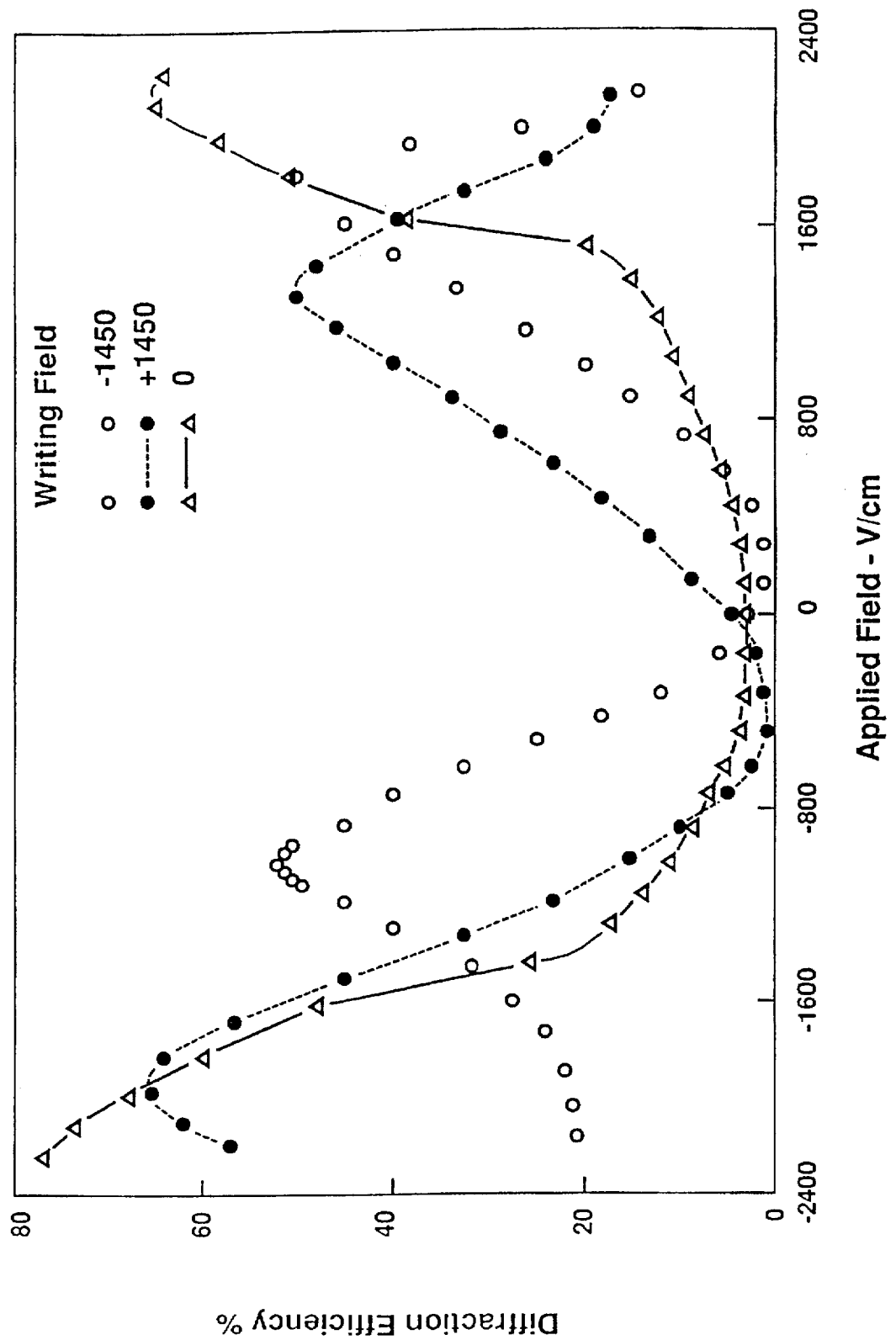
FIG. 3 is a graph showing results of diffraction efficiency determinations.

After the gratings were written, the crystal was cooled to just above the transition, and the diffraction efficiency determined as a function of applied field. The results are illustrated in FIG. 3. The three curves shown are for gratings which were written at +1450 V/cm, 0 V/cm, and −1450 V/cm.

The highest diffraction efficiency observed for 488 nm writing beams was 75% for a sample of thickness 2.9 mm, where corrections were made for fresnel losses. For 514 nm writing beams the diffraction efficiency was reduced to 30%, and at 633 nm, the diffraction was almost undetectable. The writing times for maximum diffraction roughly followed $\tau_{write} \sim 6$ sec$^2$-cm$^2$/J, incident intensity on he crystal. From the calculated index modulation of $n_r=8.5\times10^{-5}$, it was determined that the space charge field was $E_{SC}=150$ V/cm. Using the writing time of 180 sec at beam intensities adding up to 27.2 mW, the estimated sensitivity for the crystal was $7.30\times10^{-6}$ cm$^3$/J for an applied field of 1.6 kV/cm. Following the procedure outlined above, the erase time near $T_c$ was up to two orders of magnitude longer than the write time at $T_c+15°$.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A photorefractive crystal having the formula $K_{1-y}Li_yTa_{1-x}Nb_xO_3$ wherein x is between 0 and 1 and y is between 0.0001 and 0.15 and wherein said crystal has a perovskite structure which provides said crystal with a temperature dependent display of conventional photorefractive effect, zero electric field photorefractive effect, voltage controlled effect and dielectric photorefractive effect.

2. A composition of matter according to claim 1 wherein said photorefractive crystal comprises a dopant.

3. A composition of matter according to claim 2 wherein said dopant is selected from the group consisting of copper, chromium, vanadium, iron, manganese, nickel, europium and cerium.

4. A composition of matter according to claim 3 wherein said dopant is copper and/or vanadium.

5. A composition of matter according to claim 1 wherein y is between about 0.005 and 0.09.

6. An optical sensor comprising a photorefractive crystal having the formula $K_{1-y}Li_yTa_{1-x}Nb_xO_3$, wherein x is between 0 and 1 and y is between 0.0001 and 0.15 and wherein said crystal has a perovskite structure which provides said crystal with a temperature dependent display of conventional photorefractive effect, zero electric field photorefractive effect, voltage controlled effect and dielectric photorefractive effect.

7. An optical sensor according to claim 6 wherein said photorefractive crystal comprises a dopant.

8. An optical sensor according to claim 7 wherein said dopant is selected from the group consisting of copper, chromium, vanadium, iron, manganese, nickel, europium and cerium.

9. An optical sensor according to claim 8 wherein said dopant is copper and/or vanadium.

10. An optical sensor according to claim 6 wherein y is between 0.005 and 0.09.

* * * * *

UNITED STATES PATENT AND TRADEMARK OFFICE
CERTIFICATE OF CORRECTION

PATENT NO. : 5,785,898
DATED : JULY 28, 1998
INVENTOR(S) : HOFMEISTER ET AL.

It is certified that error appears in the above-indentified patent and that said Letters Patent is hereby corrected as shown below:

In Column 1, before the "BACKGROUND OF THE INVENTION," the following Government acknowledgment should be inserted:

-- This invention was made with Government support under Grant No. DAAL03-91-G0305 awarded by the Army. The Government has certain rights in this invention. --

Signed and Sealed this

Twentieth Day of June, 2000

*Attest:*

Q. TODD DICKINSON

*Attesting Officer*   *Director of Patents and Trademarks*